United States Patent
Lu

(10) Patent No.: US 11,216,387 B2
(45) Date of Patent: Jan. 4, 2022

(54) HYBRID CACHE MEMORY AND METHOD FOR CONTROLLING THE SAME

(71) Applicant: Taiwan Semiconductor Manufacturing Co., Ltd., Hsinchu (TW)

(72) Inventor: Shih-Lien Linus Lu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 37 days.

(21) Appl. No.: 16/571,210

(22) Filed: Sep. 16, 2019

(65) Prior Publication Data

US 2021/0081331 A1 Mar. 18, 2021

(51) Int. Cl.
| G06F 12/123 | (2016.01) |
| G06F 12/0891 | (2016.01) |
| G06F 12/0877 | (2016.01) |
| G06F 12/0895 | (2016.01) |
| G06F 12/0811 | (2016.01) |

(52) U.S. Cl.
CPC ........ *G06F 12/123* (2013.01); *G06F 12/0811* (2013.01); *G06F 12/0877* (2013.01); *G06F 12/0891* (2013.01); *G06F 12/0895* (2013.01)

(58) Field of Classification Search
CPC ............. G06F 12/0811; G06F 12/0877; G06F 12/0891; G06F 12/0895; G06F 12/123
See application file for complete search history.

(56) References Cited

U.S. PATENT DOCUMENTS

| 6,842,180 B1* | 1/2005 | Maiyuran | G06F 12/0862 711/122 |
| 2010/0191916 A1* | 7/2010 | Balakrishnan | G06F 12/0864 711/134 |
| 2014/0047184 A1* | 2/2014 | Kang | G06F 12/0806 711/122 |
| 2016/0062892 A1* | 3/2016 | Guthrie | G06F 12/12 711/122 |
| 2020/0320004 A1* | 10/2020 | Mestan | G06F 12/0837 |

* cited by examiner

*Primary Examiner* — Aracelis Ruiz
(74) *Attorney, Agent, or Firm* — JCIPRNET

(57) ABSTRACT

A hybrid cache memory and a method for controlling the same are provided. The method for controlling a cache includes: receiving a request for data; determining whether the requested data is present in a first portion of the cache, a second portion of cache, or not in the cache, wherein the first portion of cache has a smaller access latency than the second portion of cache; loading the requested data from a memory of a next level into the first portion of the cache and the second portion of the cache if the requested data is not in the cache, and retrieving the requested data from the first portion of the cache; and retrieving the requested data from the first portion of the cache or the second portion of the cache without writing data to the second portion of the cache if the requested data is in the cache.

20 Claims, 6 Drawing Sheets

| Reference | Access Type | Hit/Miss | MRU (SRAM) | MRAM-way1 | MRAM-way2 | MRAM-way3 | MRAM-way4 | LRU pointer | Notes |
|---|---|---|---|---|---|---|---|---|---|
| 1 | A | R | miss | A | A | | | | 1 | write to empty way |
| 2 | B | R | miss | B | A | B | | | 1 | write to empty way |
| 3 | C | R | miss | C | A | B | C | | 1 | write to empty way |
| 4 | D | R | miss | D | A | B | C | D | 1 | write to empty way |
| 5 | A | R | hit | A | A | B | C | D | 2 | no write; update LRU ptr (hit to LRU) |
| 6 | B | R | hit | B | A | B | C | D | 3 | no write; update LRU ptr (hit to LRU) |
| 7 | C | R | hit | C | A | B | C | D | 4 | no write; update LRU ptr (hit to LRU) |
| 8 | D | R | hit | D | A | B | C | D | 1 | no write; update LRU ptr (hit to LRU) |
| 9 | C | R | hit | C | A | B | C | D | 1 | no write; not update LRU ptr |
| 10 | A | R | hit | A | A | B | C | D | 2 | no write; update LRU ptr (hit to LRU) |
| 11 | B | R | hit | B | A | B | C | D | 4 | no write; update LRU ptr (hit to LRU) |
| 12 | A | R | hit | A | A | B | C | D | 4 | no write; not update LRU ptr |
| 13 | E | R | miss | E | A | B | C | E | 3 | replace LRU way, update LRU ptr;load to MRU |
| 14 | A | R | hit | A | A | B | C | E | 3 | no write; not update LRU ptr |
| 15 | B | R | hit | B | A | B | C | E | 3 | no write; not update LRU ptr |
| 16 | C | R | hit | C | A | B | C | E | 3 | no write; update LRU ptr (hit to LRU) |
| 17 | F | R | miss | F | A | B | C | F | 1 | replace LRU way, update LRU ptr; load to MRU |
| 18 | G | R | miss | G | G | B | C | F | 2 | replace LRU way, update LRU ptr; load to MRU |
| 19 | F | R | hit | F | G | B | C | F | 2 | no write; not update LRU |

FIG. 5A

| | Reference | Access Type | Hit /Miss | MRU (SRAM) | MRAM– way1 | MRAM– way2 | MRAM– way3 | MRAM– way4 | LRU pointer | Notes |
|---|---|---|---|---|---|---|---|---|---|---|
| 20 | B | R | hit | B | G | B | C | F | 3 | no write; update LRU ptr (hit to LRU) |
| 21 | C | R | hit | C | G | B | C | F | 1 | no write; update LRU ptr (hit to LRU) |
| 22 | B | R | hit | B | G | B | C | F | 1 | no write; not update LRU ptr |
| 23 | H | R | miss | H | H | B | C | F | 4 | replace LRU way; update LRU ptr; load to MRU |
| 24 | I | R | miss | I | H | B | C | I | 3 | replace LRU way; update LRU ptr; load to MRU |
| 25 | J | R | miss | J | H | B | J | I | 2 | replace LRU way; update LRU ptr; load to MRU |
| 26 | K | R | miss | K | H | K | J | I | 1 | replace LRU way; update LRU ptr; load to MRU |
| 27 | J | R | hit | J | H | K | J | I | 1 | no write; not update LRU ptr |
| 28 | J | W | hit | J | H | K | J | I | 1 | no write; not update LRU ptr; update status (dirty) |
| 29 | K | W | hit | K | H | K | J | I | 1 | no write; not update LRU ptr; update status (dirty) |
| 30 | H | W | hit | H | H | (inv) | J | I | 4 | no write; update LRU ptr (hit to LRU); update status (dirty) |
| 31 | A | R | miss | A | A | (inv) | J | I | 4 | write to invalid way (not update LRU ptr) |
| 32 | J | R | hit | J | A | (inv) | J | I | 4 | no write |
| 33 | B | R | miss | B | A | B | J | I | 4 | write to invalid way (not update LRU ptr) |
| 34 | C | W | miss | C | A | B | J | C | 1 | replace LRU way; update LRU ptr; load to MRU |

FIG. 5B

HYBRID CACHE MEMORY AND METHOD FOR CONTROLLING THE SAME

BACKGROUND

Modern processors generally employ main memory for data storage. To speed up the access of main memory, cache memory may be provided between main memory and the processor to store frequently accessed data and codes. Cache memory generally operates faster than main memory so accesses for data from cache memory are more quickly. Cache memory can be implemented using different types of semiconductor memory such as static random access memory (SRAM). SRAM devices are relatively fast compared to alternative memory devices and are therefore commonly used. However, SRAM devices is relatively large in cell array compared to alternative memory devices and therefore, they occupy more space than possible alternative memory devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5A and FIG. 5B are tables illustrating an example of the operation of a hybrid cache memory in accordance with some embodiments.

DESCRIPTION OF THE EMBODIMENTS

Figure 1:
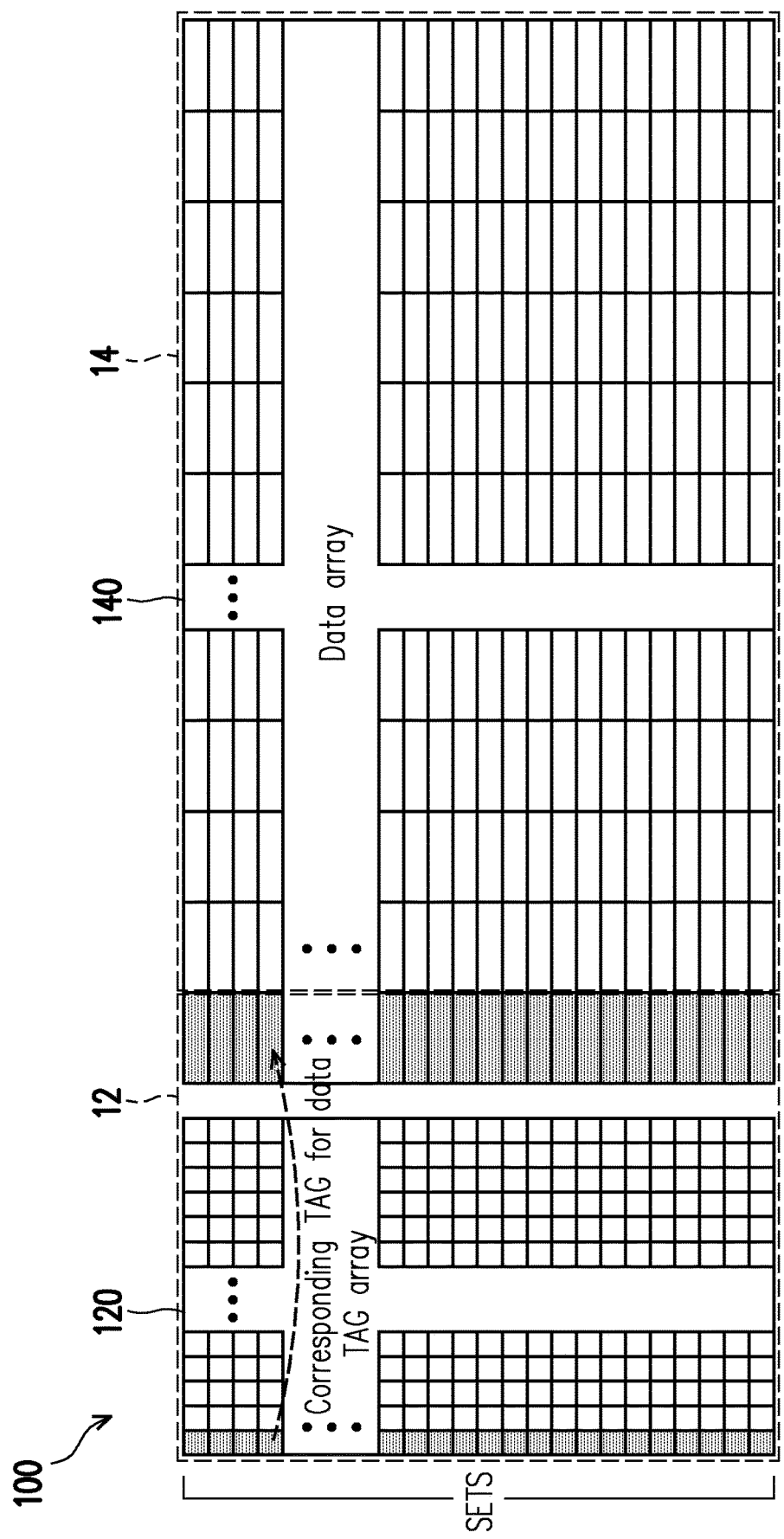
FIG. 1 is a schematic diagram illustrating a design of a hybrid cache memory in accordance with some embodiments.

The following disclosure p many different embodiments, or examples, for implementing different features of the present disclosure. Specific examples of components and arrangements are described below to simplify the present disclosure. These are, of course, merely examples and are not intended to be limiting. For example the for ion of a first feature over or on a second feature in the description that follows ay include embodiments in hick the first and second features are formed in direct contact and may also include embodiments in which additional features may be formed between the first and second features, such that the first and second features r ray not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Cache memory is a type of memory that is used in connection with processors (e.g., central processing units (CPU), accelerated processing units (APU), and/or graphics processing units (GPU)) to reduce memory access latency and to address bandwidth pressures associated with main memory. Cache memory generally comprises a data array and a tag array. The data array stores data for use by the processor and the tag array stores address and other status information (e.g., if the data has been changed or not) for the data stored in the data array. In some embodiments, the cache may also maintain replacement information to manage the cache during different operations (e.g., if a cache miss occurs and the relevant portion of cache is full). Cache may be located close to or on the same chip as the associated processor. Caches can be implemented using a variety of circuits based on various semiconductor technologies. For example, cache memory may be implemented using static random access memory (SRAM) circuits based on complementary metal oxide semiconductor (CMOS) technology. SRAM memory cells may consist of six transistors (e.g., a pair of cross-coupled inverters and two access devices). SRAM memory devices are relatively fast compared to alternative memory technologies and are therefore commonly used over alternative technologies. However, SRAM memory devices may be relatively large compared to alternative memory circuits and technologies and therefore, they occupy more space than possible alternative memory technologies. In a cache hierarchy, there are many levels of cache (e.g. level 1, level 2, level 3, etc.) In certain embodiments, a lower level of cache (e.g. level 2, level 3, or beyond) is adopted in the embodiments of the disclosure.

In certain embodiments, since a lower level cache needs larger capacity, a relatively large amount of cache is included in a processing system, and when a memory array is large in capacity, it is normally slower. If a cache were composed of SRAM memory, that cache might occupy an unacceptable amount of space within the processing system. Accordingly, an alternative memory technology may be considered. The alternative memory technology may be one that has a smaller cell size than the SRAM memory cells, such as a magnetic random access memory (MRAM) or a spin-transfer torque MRAM (STT-MRAM), or other new emerging memories such as ReRAM, PCRAM, or FeRAM. MRAM is non-volatile (NV) and is generally smaller than SRAM but slower than SRAM because there is a higher energy barrier to overcome. MRAM typically consumes less power in standby mode in comparison with SRAM. But, due to the relatively small resistivity difference between logic states, it may be more difficult to sense the correct data value from an MRAM cell, resulting in a longer read latency. Many newly emerging memories are non-volatile (NV). This implies there is a higher energy barrier to keep the state (NV). It usually requires much more energy to overcome the barrier so the write energy is higher and write latency is much longer. Moreover, NVM (due to the fact that the energy barrier is higher), needs higher current to write thus has shorter "life-time" or lower endurance. Another important motivation for this invention is to reduce writes to NVM so the life-time can be extended (more reliable cache).

To mitigate the tradeoff between size and speed for cache design, a hybrid approach may be utilized in which a portion of the data array of the cache is implemented using one type of memory cell (e.g., faster SRAM cells) and another portion of the cache is implemented using another type of memory cell (e.g., smaller MRAM cells). By combining two different memory technologies, memory density and latency can both be improved.

FIG. 1 is a schematic diagram illustrating a design of a hybrid cache memory in accordance with some embodiments. Referring to FIG. 1, a cache memory 100 of the present example comprises a tag array 120 and a data array 140. The tag array 120 and at least one way (e.g., the shaded column) in the data array 140 are implemented with SRAM 12 in which each cell of the tag array 120 stores address and other status information for the data stored in the corresponding cell of the data array 140. The other ways in the data array 140 are implemented with MRAM 14. A total number of ways (associativity) in the data array 140 depends on the behavior of the programs running on the processor and may be 4, 8, 16, 24, 32 or an arbitrary number, which is not limited herein. However, it is sometimes set to a number (such as power of 2) to ease the recency record keeping, which indicates how recent a way is used. The number of ways respectively implemented with SRAM 12 and MRAM 14 may also be any combination. The way implemented with SRAM 12 may be one of N ways of the cache memory 100 (N is 4, 8, 16, 24, 32, for example) and may be an addition way other than the N ways, which is not limited herein. For example, the capacity of the way implemented with SRAM 12 may be one-sixteenth (about 6%) or one thirty-second (about 3%) of the total capacity of the cache memory 100. Another parameter is cache set number (SETS in FIG. 2). The capacity (data array) is determined by the product of sets, ways and cache-line size. For example, a cache with 64K (64×1024) sets, 32-way, and cache-line size of 64B has a total capacity of 128 MB.

To obtain acceptable average latency, in some embodiments, the hybrid cache memory may be designed such that the majority of accesses (in particular—writes) to the hybrid cache memory are to the portion implemented with the fast memory technology (e.g., SRAM). It also avoids writes to MRAM to improve life-time.

In operation, most of the cache accesses are directed to the most recently used (MRU) data in the system. Accordingly, in some embodiments, the MRU data may be maintained in SRAM (e.g., always available for access in SRAM). This type of policy may involve data migration between SRAM and MRAM during operation so that the most recently used data is stored in the faster SRAM portion.

Figure 2:
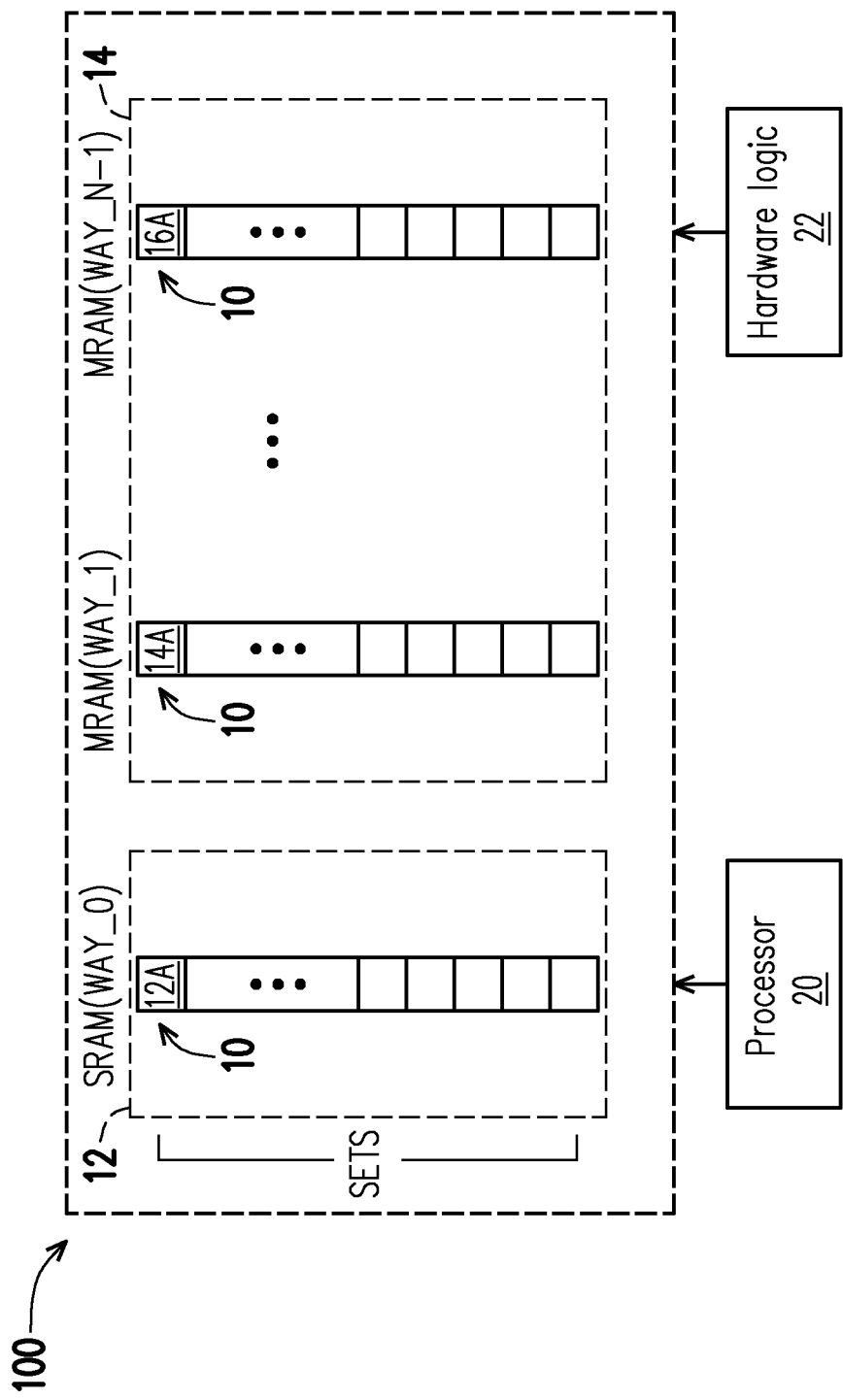
FIG. 2 is a schematic diagram illustrating a hardware structure of a hybrid cache memory in accordance with some embodiments.

FIG. 2 is a schematic diagram illustrating a hardware structure of a hybrid cache memory in accordance with some embodiments. FIG. 2 illustrates the hardware structure of the cache memory 100 in FIG. 1, which includes a plurality of cache sets, including cache set 10. Although multiple cache sets are illustrated, for the purposes of illustration, only one cache set 10 will be discussed with reference to the embodiment illustrated in FIG. 2. The cache set 10 may include a plurality of ways WAY_0, . . . , WAY_N−1 and each of the ways WAY_0, . . . , WAY_N−1 may include a corresponding data block 12A, 14A, 16A. As illustrated, the way implemented by SRAM 12 may be identified as WAY_0, and the plurality of ways implemented by MRAM 14 may be identified as WAY_1, . . . , WAY_N−1, where N is an integer. Each data block 12A, 14A, 16A may include a plurality of memory cells for storing data.

The cache memory 100 may also be in communication with a processor 20 configured to communicate with the cache memory 100 and a hardware logic 22 configured to control the operation of the cache memory 100. In particular, as described herein, requests for data may be made from the processor 20 and the movement of data within the cache may be controlled by the hardware logic 22.

As illustrated in FIG. 2, the cache set 10 includes one SRAM way WAY_0 implemented with SRAM 12 and a plurality of MRAM ways WAY_1-WAY_N−1 implemented with MRAM 14. SRAM way WAY_0 includes block 12A. MRAM way WAY_1 includes block 14A. MRAM way WAY_N−1 includes block 16A. When the cache memory 100 is in operation, data in individual memory cells within the data blocks 12A, 14A and 16A can be addressed and accessed individually. However, data may be copied or moved by block to take advantage of spatial locality.

As discussed above, when the cache memory 100 is in operation, most of the cache accesses are directed to the MRU data in the system. However, to take further advantage of the cache memory 100 and further reduce average latency, the number of cache accesses directed to the faster portion of the cache, i.e., the SRAM 12 may be increased. Accordingly, in some embodiments, the MRU data may be maintained in SRAM (e.g., always available for access in SRAM). As illustrated in FIG. 2, the MRU portion of the cache memory 100 is in the SRAM way WAY_0 of the SRAM 12.

In some embodiments, in operation, there are five possible scenarios when an access for data is issued by the processor 20:

In the first scenario, the requested data is not located in the cache memory 100 and there are empty ways or ways which have been invalidated (e.g., WAY_0 to WAY_N−1) in the cache set 10;

In the second scenario, the requested data is not located in the cache memory 100 and all of the ways WAY_0 to WAY_N−1 in the cache set 10 are filled with data;

In the third scenario, the requested data is already in the MRU portion (e.g., SRAM way WAY_0) of the SRAM 12;

In the fourth scenario, the requested data is in the least recently used (LRU) portion of the cache memory 100; and In the fifth scenario, the requested data is in the cache memory 100 and is not located in the MRU portion or the LRU portion of the cache memory 100.

In some embodiments, each of these five scenarios may be addressed with a corresponding procedure.

For the first scenario, if the requested data is not located in the cache memory 100 and there is an empty way among MRAM ways WAY_1 to WAY_N−1, the procedure may proceed to fill the empty way and the MRU portion. For example, if the MRAM way WAY_1 is empty, the data is loaded from a main memory into both of the MRAM way WAY_1 and the SRAM way WAY_0. Additionally, the corresponding tag for the data in the tag array 120 is updated and a pointer identifying the LRU portion (e.g., MRAM way WAY_1) remains unchanged.

For the second scenario, if the requested data is not located in the cache memory 100 and there is no empty way (i.e., all of the MRAM ways WAY_1 to WAY_N are filled with data), the data is loaded from the main memory into the LRU portion such as MRAM way WAY_1 (or another way targeted by another replacement algorithm) and the MRU portion (i.e., the SRAM way WAY_0). Then, the pointer for the LRU portion (or the replacement status) is updated (e.g., incremented) to point to a new way (e.g., MRAM way WAY_2).

For the third scenario, if the requested data is already in the MRU portion of the cache memory 100 (e.g., the SRAM way WAY_0), the data is directly accessed from the MRU portion and no extra operation is performed. In some embodiments, this procedure may be executed in about 90% of the data access requests.

For the fourth scenario, if the requested data is in the LRU portion (or another way targeted by another replacement algorithm) of the cache memory 100, the data in the LRU portion may be duplicated to the MRU portion and then the corresponding tag for the data in the tag array 120 is updated and the pointer for the LRU portion (or the replacement status) is updated (e.g., incremented) to point to a new way. In some embodiments, the way of the LRU portion of the cache memory 100 where the requested data is located may be invalidated after duplication.

For the fifth scenario, if the requested data is in the cache memory 100, but not located in the MRU portion or the LRU portion, the procedure may proceed in one of two ways. In the first way, the data is read and duplicated to the MRU portion and the corresponding tag for the data in the tag array 120 is updated. In the second way, the data is read and a counter is incremented to determine whether to duplicate the data to the MRU portion. That is, the data is duplicated to the MRU portion when the counter reaches a threshold. In this situation, the pointer for the LRU portion (or the replacement status) is not updated. In some embodiments, the way of the cache memory 100 where the requested data is located may be invalidated after duplication.

In some embodiments, if the requested data is in the non-MRU portion (e.g., the MRAM ways WAY_1 to WAY_N−1) of the cache memory 100, a condition that whether the data in the MRU portion (e.g., the SRAM way WAY_0) is dirty (i.e., whether the data has been written back to a main memory of the system) is further determined.

When the data in the MRU portion is dirty (i.e., the data has not been written back to the main memory of the system), if the request for data is read and the requested data is located in a way of the LRU portion of the cache memory 100, the pointer for the LRU portion (or the replacement status) is updated to be pointed to another way of the non-MRU portion of the cache memory 100. However, the pointer for the LRU portion (or the replacement status) may not be updated if the requested data is in a way other than the LRU portion. On the other hand, if the request for data is write and the requested data is located in a way of the non-MRU portion of the cache memory 100, the requested data is duplicated to the MRU portion and merged with the new data after the data originally in the MRU portion is written back to the main memory. It is noted that no data swap is performed between the SRAM 12 and the MRAM 14 (i.e., no write to the MRAM 14), and therefore the access latency of the cache memory 100 can be improved.

When the data in the MRU portion is clean (i.e., the data has been written back to the main memory of the system), if the request for data is read and the requested data is located in a way of the LRU portion of the cache memory 100, the requested data is duplicated to the MRU portion and the pointer for the LRU portion (or the replacement status) is updated to be pointed to another way of the non-MRU portion of the cache memory 100. However, the pointer for the LRU portion (or the replacement status) may not be updated if the requested data is in a way other than the LRU portion. On the other hand, if the request for data is write and the requested data is located in a way of the non-MRU portion of the cache memory 100, the requested data is duplicated to the MRU portion and merged with the new data. It is noted that, in some embodiments, the way of the cache memory 100 where the requested data is located may be invalidated after duplication.

Figure 3:
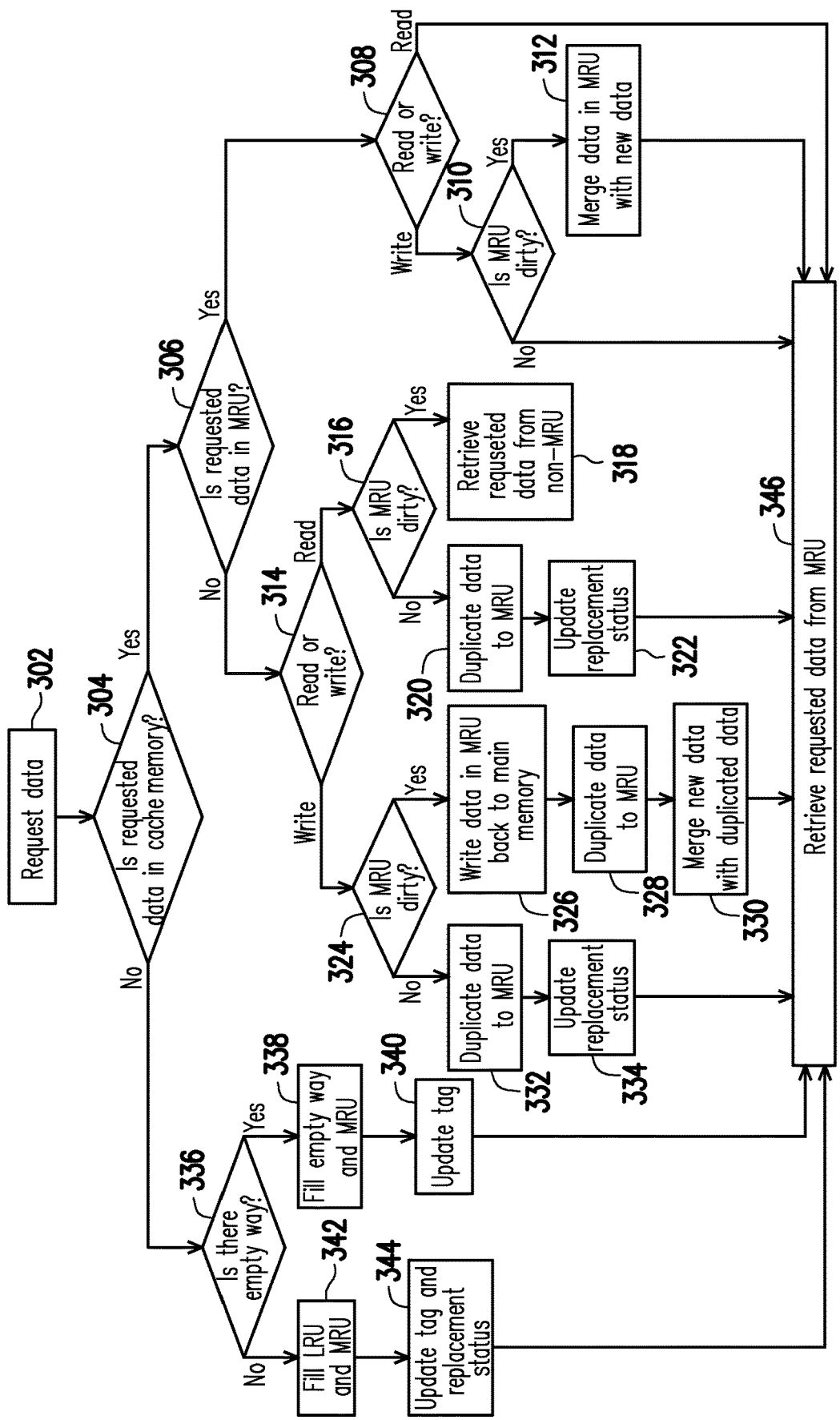
FIG. 3 is a flow chart illustrating the operation of a hybrid cache memory in accordance with some embodiments.

FIG. 3 is a flow chart illustrating the operation of a hybrid cache memory in accordance with some embodiments. In some embodiments, the operation may be implemented in hardware via e.g., a finite state machine. While this embodiment addresses all five operating scenarios discussed above, other embodiments, may achieve similar results in different manners (e.g., by reordering the steps of the illustrated process) or by selecting an entirely different process. The example of FIG. 3 is not limited to any specific hardware implementation and is applicable to many hardware arrangements. The example is described below while referencing the hardware components of FIG. 1 and FIG. 2 for ease of visualization. Additionally, in some embodiments, the operations described herein may be skipped, additional operations may be added and/or the order of operations may be changed.

Initially, in operation 302, the processor 20 requests data. In operation 304, the processor 20 determines whether the requested data is present in the cache memory 100. In some embodiments, the processor 20 determines whether the requested data is present in the cache memory 100 by looking up the tag array 120 to get hit/miss information.

If the data is in the cache memory 100, the processor 20 continues with operation 306 to determine whether the requested data is in MRU (e.g., the SRAM way WAY_0). If the data is present in MRU (i.e., hit to MRU), the processor 20 determines the requested for data is read or write in operation 308. If the request for data is read (i.e., read hit to MRU), the processor 20 retrieves the requested data from the MRU in operation 346 without doing any update. If the request for data is write (i.e., write hit to MRU), the procedure may proceed in one of two ways. That is, the processor determines whether MRU is dirty in operation 310. If the MRU is dirty, the processor 20 merges the data in the MRU with the new data in operation 312, and retrieves the requested data from the MRU in operation 346; and if the MRU is not dirty, the processor 20 executes nothing but retrieves the requested data from the MRU in operation 346.

On the other hand, if the requested data is not in MRU, which means the requested data is in non-MRU such as the MRAM way WAY_1 to WAY_N−1 (i.e., hit to non-MRU), the processor 20, in operation 314, determines the requested for data is read or write.

If the request for data is read (i.e., read hit to non-MRU), the processor 20 determines whether the MRU is dirty in operation 316. If the MRU is dirty, the processor 20 retrieves the requested data from non-MRU (i.e., the way of the LRU portion in the MRAM 14). If the MRU is not dirty, the processor 20 duplicates the requested data from non-MRU (i.e., the way of the LRU portion in the MRAM 14) to MRU (i.e., the way of the MRU portion in the SRAM 12) in operation 320, updates a replacement status to point to another way of the MRAM 14 in operation 322, and then retrieves the requested data from MRU in operation 346. In other embodiments, the processor 20 may invalidate the way of the LRU portion in the MRAM 14 after duplicating the requested data to the MRU, and then retrieves the requested data from MRU in operation 342. Since no data writing to the MRAM 14 is performed, the access latency of the cache memory 100 can be improved.

On the other hand, if the request for data is write (i.e., write hit to non-MRU), the processor 20 determines whether the MRU is dirty in operation 324. If the MRU is dirty, the processor 20 writes the data in MRU back to the main memory of the system in operation 326, then proceeds to operation 328 to duplicate the requested data from non-MRU (i.e., the MRAM 14) to MRU and merges new data with the duplicated data in operation 330, and finally in operation 342, retrieves the requested data from MRU. If the MRU is not dirty, the processor 20 duplicates the data from non-MRU (i.e., the MRAM 14) to MRU in operation 332, updates a replacement status to point to another way of the MRAM 14 in operation 334 if the requested data is located in a way of the LRU portion in the MRAM 14, and then retrieves the requested data from MRU in operation 346. However, if the requested data is located in a way other than the way of the LRU portion in the MRAM 14, the processor 20 may skip operation 334 to directly retrieve the requested data from MRU in operation 342. Further, in some embodiments, the processor 20 may invalidate the way of the MRAM 14 where the requested data is located after duplication so as to release the way for further use, and in some embodiments, the processor 20 may just leave the data in the way until the data is replaced.

Back to the operation 304, if the data is not in the cache memory 100 (i.e., miss), the processor 20 continues with operation 332 to determine whether there is an empty way in the MRAM 14. If there is an empty way, in operation 334, the processor 20 fills the empty way and MRU. That is, the processor 20 loads the requested data from a memory of a next level into the empty way in the MRAM 14 and the MRU (e.g., the SRAM way WAY_0), wherein the memory of the next level may be an L3 cache with a level next to the SRAM 12 (e.g., L1 or L2 cache) or a main memory of the system, which is not limited herein. Then, in operation 336, the processor 20 updates the tag corresponding to the requested data in the tag array 120. Finally, in operation 342, the processor 20 retrieves the requested data from MRU in operation 342.

If there is no empty way, in operation 338, the processor 20 fills LRU and MRU. That is, the processor 20 loads the requested data from a memory of a next level into the way of the LRU portion in the MRAM 14 and the MRU (e.g., the SRAM way WAY_0). Then, in operation 340, the processor 20 updates the tag corresponding to the requested data in the tag array 120 and the replacement status to point to another way of the MRAM 14. Finally, in operation 342, the processor 20 retrieves the requested data from MRU in operation 342.

In some embodiments, if the requested data is in the non-MRU portion (e.g., the MRAM ways WAY_1 to WAY_N−1) of the cache memory 100, another algorithm is provided so that there is no need to check whether the data in the MRU portion (e.g., the SRAM way WAY_0) is dirty. In detail, if the request for data is read (i.e., read hit to non-MRU), the requested data in the non-MRU portion is duplicated to a second most recently used (MRU) way (e.g., a SRAM way WAY_0'). Accordingly, there is no need to write data to MRAM or other emerging NVM, and only the status information is updated. The data in MRU can be kept in the same place where there may be other hit (read or write) later, and no data replacement is required even if the MRU is dirty. On the other hand, if the request for data is write (i.e., write hit to non-MRU), two methods can be used. First, the data can be written though to the main memory. Since the write to MRAM is long (close to the write to main memory such as DRAM), the data can be directly written though to the main memory. Second, a write buffer is adopted and the data is written to the MRAM through the write buffer, and the status information is updated. Since the data in MRU is not evicted, the data in MRU can be kept for a later hit.

Figure 4:
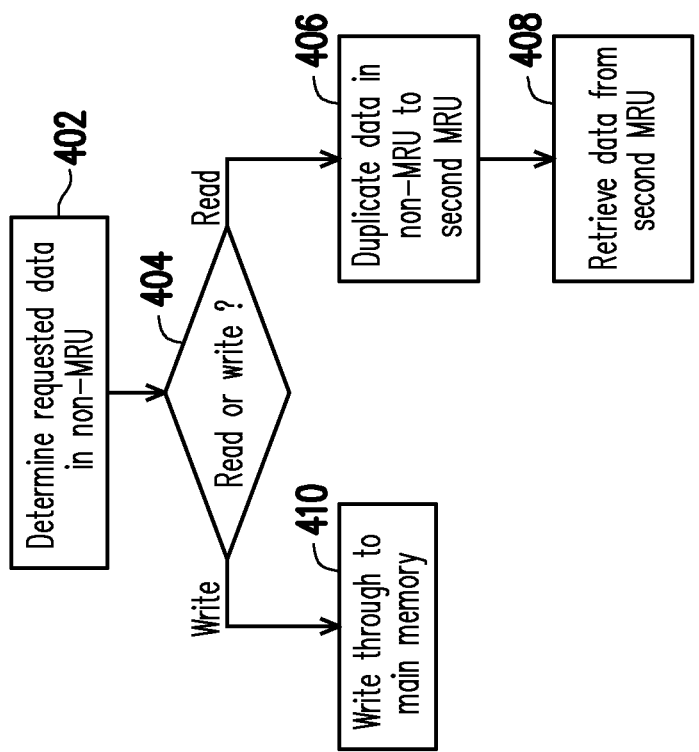
FIG. 4 is a flow chart illustrating the operation of a hybrid cache memory in accordance with some embodiments.

FIG. 4 is a flow chart illustrating the operation of a hybrid cache memory in accordance with some embodiments. The example is described below while referencing the hardware components of FIG. 1 and FIG. 2 for ease of visualization, and the example is given as an alternative method for the steps 314 to 334 in FIG. 3. Additionally, in some embodiments, the operations described herein may be skipped, additional operations may be added, and/or the order of operations may be changed.

First, the processor 20 determines that the requested data is in non-MRU portion (e.g., the MRAM way WAY_1 to WAY_N−1) in operation 402, and further determines the requested for data is read or write in operation 404.

If the request for data is read (i.e., read hit to non-MRU), the processor 20 duplicates the requested data in the non-MRU portion to a second most recently used (MRU) way in in the MRU portion in operation 406 and retrieves the data from the second MRU way in operation 408. Accordingly, there is no need to check whether the data in the first MRU way is dirty, and the data in the first MRU way can be kept for a later hit.

If the request for data is write (i.e., write hit to non-MRU), the processor 20 writes data through to the main memory in operation 410. Since the time costed by the write to MRAM is close to the time costed by the write to main memory, the data can be directly written though to the main memory.

In some embodiments, the processor 20 may writes the data to the non-MRU portion (e.g., the MRAM way WAY_1 to WAY_N−1) and updates the replacement status accordingly. That is, if the requested data is located in a way of the LRU portion in the MRAM 14, the processor 20 writes the data to the LRU portion in operation 346 and updates the replacement status; and if the requested data is located in a way other than the way of the LRU portion in the MRAM 14, the processor 20 writes the data to that way.

FIG. 5A and FIG. 5B are tables illustrating an example of the operation of a hybrid cache memory in accordance with some embodiments. The example illustrated in FIG. 5A and FIG. 5B is of a 4-way (including MRAM-way1, way2, way3 and way4 implemented with MRAM, hereinafter "way1, way2, way3 and way 4" for easy illustration) cache with an additional MRU way implemented with SRAM. Each row of the table indicates a data request by the system. The data request is for the data in the first column (Reference). The second column indicates the access type of the request in which "R" represents "read" and "W" represents "write". The third column indicates the conditions that the requests correspond to (hit/miss). The next five columns correspond to ways of data (i.e., MRU way, and way1 to way4). The ninth column indicates the value of an LRU pointer which points to the LRU way among way1 to way4. The shaded cell (way1 in the first row, way2 in the fifth row, etc.) in the table corresponds to the LRU way and as can be readily seen, the location of the LRU way changes as a function of the LRU pointer which may be updated based on certain requests (described in more detail below). The last column describes the changes that occur to the cache set 10 based on the data request.

In row 1 of FIG. 5A (below the headings), a read request for data A is made. Since the way1 to way4 are all empty in the beginning, the data A is loaded into the way1 and the MRU way from the main memory of the system. In the row 2, a read request for data B is made. Since there are empty ways (way2 to way4), the data B is loaded into the way2 and the MRU way. For the same rationale, in row 3 and row 4, the data C and D are respectively loaded into the way 3 and way 4, and the MRU way.

In row 5, a read request for data A is made again. Since the data A is already in the way1 and the LRU pointer is also pointed to the way1 (i.e., hit to LRU), the data A is loaded to the MRU way and no write to MRAM is performed. In addition, since the data A in the way1 is read again, which means the way1 is not the least recently used way, the LRU pointer is updated to be pointed to the way2. Similarly, in rows 6 to 8, read requests for data B, C and D are respectively made, the data B, C and D are respectively loaded to the way 2, way 3 and way4, and the LRU pointer is correspondingly updated to be pointed to the way3, way 4 and back to the way1.

In row 9, a read request for data C is made. Since the data C is already in the way3 while the LRU pointer is pointed to the way1 (i.e., not hit to LRU), the data C is loaded to the MRU way and no write to MRAM is performed. Further, since the read request does not hit to LRU, there is no need to update the LRU pointer and therefore the value of the LRU pointer remains 1.

In row 10, a read request for data A is made. Since the data A is already in the way1 and the LRU pointer is also pointed to the way1 (i.e., hit to LRU), the data A is loaded to the MRU way and no write to MRAM is performed. In addition, since the data A in the way1 is used, the LRU pointer is updated to be pointed to the way2. In row 11, a read request for data B is made. Since the data B is already in the way2 and the LRU pointer is also pointed to the way2 (i.e., hit to LRU), the data B is loaded to the MRU way and no write to MRAM is performed. In addition, since the data B in the way2 is used, and the data C in the way3 is also used in row 9, the LRU pointer is updated to be pointed to the way4. In row 12, a read request for data A is made. Since the data A is already in the way1 while the LRU pointer is pointed to the way4 (i.e., not hit to LRU), the data A is loaded to the MRU way and no write to MRAM is performed. Further, since the read request does not hit to LRU, there is no need to update the LRU pointer and therefore the value of the LRU pointer remains 4.

In row 13, a read request for data E is made. Since the data E is not in the cache memory (i.e., the MRU way and the way1 to way4), the data E is loaded into the way4 pointed by the LRU pointer and the MRU way from the main memory of the system. In addition, since the data A in the way1 and the data B in the way2 are used in row 11 and row 12, the LRU pointer is updated to be pointed to the way3.

In rows 14 to 19 shown in FIG. 5A and rows 20 to 27 continued shown in FIG. 5B, the data is loaded and the LRU pointer is updated following the rules as illustrated in the descriptions of rows 1 to 13 and therefore the detailed descriptions are omitted.

In row 28, a write request for data J is made. Since the data J is already in the MRU way and the way3 and the LRU pointer is pointed to the way1 (i.e., not hit to LRU), there is no need to load the data J to the MRU way, and the data J in the MRU way is directly merged with new data J. Further, no write to MRAM is performed, and there is no need to update the LRU pointer. However, since the data J in the MRU way has been changed, the data J in the MRU way is different from the data J in the way3, which means there is no duplication of the data J in the MRAM and the main memory, and therefore the status of the data J in the MRU way is updated as dirty (i.e., has not been written back to the main memory) to avoid loss of the data J in subsequent operations.

In row 29, a write request for data K is made. Since the data K is already in the way2 and the LRU pointer is pointed to the way1 (i.e., not hit to LRU), the data K in the way2 is arranged to be duplicated to the MRU way and merged with new data K. However, since the data J in the MRU way is recorded as dirty, before loading the data K to the MRU way, the data J in the MRU way is duplicated to the main memory of the system. After the data K in the way2 is loaded to the MRU way and merged with new data K, the status of the data K in the MRU way is updated as dirty, and the way2 is further invalidated so as to release the way for further use.

In row 30, a write request for data H is made. Since the data H is already in the way1 and the LRU pointer is pointed to the way1 (i.e., hit to LRU), the data H in the way1 is arranged to be duplicated to the MRU way and merged with new data H. However, since the data K in the MRU way is recorded as dirty, before loading the data H to the MRU way, the data K in the MRU way is duplicated to the main memory of the system. After the data H in the way1 is loaded to the MRU way and merged with new data H, the status of the data H in the MRU way is updated as dirty, the LRU pointer is updated to be pointed to the way4, and the way1 is further invalidated so as to release the way for further use.

In row 31, a read request for data A is made. Since the data A is not in the cache memory and the way1 is invalid (i.e., being viewed as empty), the data A is loaded into the invalid way1 and the MRU way from the main memory of the system. Further, since the read request does not hit to LRU, there is no need to update the LRU pointer and therefore the value of the LRU pointer remains 4.

In row 32, a read request for data J is made. Since the data J is in the way3 and the LRU pointer is pointed to the way4 (i.e., not hit to LRU), the data J is loaded to the MRU way and no write to MRAM is performed. Further, since the read request does not hit to LRU, there is no need to update the LRU pointer and therefore the value of the LRU pointer remains 4.

In row 33, a read request for data B is made. Since the data B is not in the cache memory and the way2 is invalid (i.e., being viewed as empty), the data B is loaded into the invalid way2 and the MRU way from the main memory of the system. Further, since the read request does not hit to LRU, there is no need to update the LRU pointer and therefore the value of the LRU pointer remains 4.

In row 34, a write request for data C is made. Since the data C is not in the cache memory, the data C is loaded into the way4 pointed by the LRU pointer and the MRU way from the main memory of the system. In addition, since the data B in the way2 and the data J in the way3 are used in row 33 and row 32, the LRU pointer is updated to be pointed to the way1.

In the embodiments as described above, the write to MRAM is occurred when there is a miss to the cache (i.e., the requested data is not in the cache memory). Since such a miss requires to load data from the main memory having a long time latency (e.g., the time latency of DRAM is at least 50 ns), the write to MRAM will tend not to affect the overall performance. As a result, memory latency of the hybrid cache memory can be improved.

According to some embodiments of the disclosure, a method for controlling a cache includes steps of receiving a request for data; determining whether the requested data is present in a first portion of the cache, a second portion of cache, or not in the cache, wherein the first portion of cache has a smaller access latency than the second portion of cache; loading the requested data from a memory of a next level into the first portion of the cache and the second portion of the cache if the requested data is not in the cache, and retrieving the requested data from the first portion of the cache; and retrieving the requested data from the first portion of the cache or the second portion of the cache without writing data to the second portion of the cache if the requested data is in the cache.

According to some embodiments of the disclosure, a hardware implemented finite state machine includes a digital logic circuit. The digital logic circuit, when operating, causes the hardware implemented finite state machine to perform operations including receiving a request for data; determining whether the requested data is present in a first portion of the cache, a second portion of cache, or not in the cache, wherein the first portion of cache has a smaller access latency than the second portion of cache; loading the requested data from a memory of a next level into the first portion of the cache and the second portion of the cache if the requested data is not in the cache, and retrieving the requested data from the first portion of the cache; and retrieving the requested data from the first portion of the cache or the second portion of the cache without writing data to the second portion of the cache if the requested data is in the cache.

According to some embodiments of the disclosure, a semiconductor memory device includes a processor, a first portion of cache, a second portion of cache and hardware implemented logic. The first portion of cache includes at least one block of data storage and is implemented using a first type of memory. The second portion of cache includes a plurality of blocks of data storage and is implemented using a second type of memory having a larger access latency than the first type of memory. The hardware implemented logic is configured to receive a request for data from the processor, determine whether the requested data is present in the first portion of the cache, the second portion of cache, or not in the cache, and load the requested data from a memory of a next level into the first portion of the cache and the second portion of the cache if the requested data is not in the cache, retrieve the requested data from the first portion of the cache, and retrieve the requested data from the first portion of the cache or the second portion of the cache without writing data to the second portion of the cache if the requested data is in the cache.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for controlling a cache, comprising:
    receiving a request for data;
    determining whether the requested data is present in a first portion of the cache, a second portion of cache, or not in the cache, wherein the first portion of cache is implemented using a first type of memory and the second portion of cache is implemented using a second type of memory, and a level of the second type of memory is lower than a level of the first type of memory;
    loading the requested data from a memory of a next level into both of the first portion of the cache and the second portion of the cache if the requested data is not in the cache, and retrieving the requested data from the first portion of the cache;
    retrieving the requested data from the first portion of the cache or the second portion of the cache without writing data to the second portion of the cache if the requested data is in the cache; and
    duplicating the requested data in the second portion of the cache to the first portion of the cache if the requested data is located in the second portion of the cache and data in the first portion of the cache has been written back to a main memory.

2. The method of claim 1, further comprising:
    determining whether the requested data is located in a way of a LRU portion in the second portion of the cache; and
    updating a replacement status to point to another way of the second portion of the cache if the requested data is located in the way of the LRU portion.

3. The method of claim 1, further comprising:
    invalidating a way of the second portion of the cache where the requested data is located after duplication.

4. The method of claim 1, further comprising:
    duplicating the requested data in the second portion of the cache to a second most recently used way in the first portion of the cache if the requested data is located in the second portion of the cache.

5. The method of claim 1, further comprising:
    updating a replacement status to point to another way of the second portion of the cache if the requested data is located in a way of a least recently used (LRU) portion in the second portion of the cache and the data in the first portion of the cache has not been written back to a main memory.

6. The method of claim 1, further comprising:
    duplicating the data in the second portion of the cache to the first portion of the cache and merging new data with the duplicated data if the requested data is located in the second portion of the cache and the data in the first portion of the cache has been written back to a main memory; and
    invalidating the way of the second portion of the cache where the requested data is located after duplication.

7. The method of claim 6, further comprising:
    determining whether the requested data is located in a way of a LRU portion in the second portion of the cache; and
    updating a replacement status to point to another way of the second portion of the cache if the requested data is located in the way of the LRU portion.

8. The method of claim 1, further comprising:
    writing the data in the first portion of the cache back to a main memory, duplicating the data in the second portion of the cache to the first portion of the cache and merging new data with the duplicated data if the requested data is located in the second portion of the cache and the data in the first portion of the cache has not been written back to the main memory; and
    invalidating the way of the second portion of the cache where the requested data is located after duplication.

9. The method of claim 1, wherein the cache is collocated with a processor on a single chip package.

10. The method of claim 1, wherein the first portion of cache comprises at least one block of data storage implemented using SRAM and the second portion of cache comprises a plurality of blocks of data storage implemented using a second memory technology with a smaller cell size than SRAM.

11. A hardware implemented finite state machine, comprising:
a digital logic circuit, which, when operating, causes the hardware implemented finite state machine to perform operations comprising:
receiving a request for data;
determining whether the requested data is present in a first portion of the cache, a second portion of cache, or not in the cache, wherein the first portion of cache is implemented using a first type of memory and the second portion of cache is implemented using a second type of memory, and a level of the second type of memory is lower than a level of the first type of memory;
loading the requested data from a memory of a next level into both of the first portion of the cache and the second portion of the cache if the requested data is not in the cache, and retrieving the requested data from the first portion of the cache;
retrieving the requested data from the first portion of the cache or the second portion of the cache without writing data to the second portion of the cache if the requested data is in the cache; and
duplicating the requested data in the second portion of the cache to the first portion of the cache if the requested data is located in the second portion of the cache and data in the first portion of the cache has been written back to a main memory.

12. A semiconductor memory device, comprising:
a processor;
a first portion of cache comprising at least one block of data storage and implemented using a first type of memory;
a second portion of cache comprising a plurality of blocks of data storage and implemented using a second type of memory, wherein a level of the second type of memory is lower than a level of the first type of memory; and
hardware implemented logic configured to:
receive a request for data from the processor;
determine whether the requested data is present in the first portion of the cache, the second portion of cache, or not in the cache; and
load the requested data from a memory of a next level into both of the first portion of the cache and the second portion of the cache if the requested data is not in the cache, and retrieve the requested data from the first portion of the cache; and
retrieve the requested data from the first portion of the cache or the second portion of the cache without writing data to the second portion of the cache if the requested data is in the cache; and
duplicate the requested data in the second portion of the cache to the first portion of the cache if the requested data is located in the second portion of the cache and data in the first portion of the cache has been written back to a main memory.

13. The semiconductor device of claim 12, wherein the hardware implemented logic is further configured to determine whether the requested data is located in a way of a LRU portion in the second portion of the cache, and update a replacement status to point to another way of the second portion of the cache if the requested data is located in the way of the LRU portion.

14. The semiconductor device of claim 12, wherein the hardware implemented logic is further configured to invalidate a way of the second portion of the cache where the requested data is located after duplication.

15. The semiconductor device of claim 12, wherein the hardware implemented logic is further configured to duplicate the requested data in the second portion of the cache to a second most recently used way in the first portion of the cache if the requested data is located in the second portion of the cache.

16. The semiconductor device of claim 12, wherein the hardware implemented logic is further configured to update a replacement status to point to another way of the second portion of the cache if the requested data is located in a way of a LRU portion in the second portion of the cache and the data in the first portion of the cache has not been written back to a main memory.

17. The semiconductor device of claim 12, wherein the hardware implemented logic is further configured to duplicate the data in the second portion of the cache to the first portion of the cache and merging new data with the duplicated data if the requested data is located in the second portion of the cache and the data in the first portion of the cache has been written back to a main memory, and invalidate the way of the second portion of the cache where the requested data is located after duplication.

18. The semiconductor device of claim 12, wherein the hardware implemented logic is further configured to duplicate the data in the first portion of the cache to a main memory, duplicate the data in the second portion of the cache to the first portion of the cache and merge new data with the duplicated data if the requested data is located in the second portion of the cache and the data in the first portion of the cache has not been written back to the main memory, and invalidate the way of the second portion of the cache where the requested data is located after duplication.

19. The semiconductor device of claim 12, wherein the first portion of cache comprises at least one block of data storage implemented using static random access memory (SRAM) and the second portion of cache comprises a plurality of blocks of data storage implemented using a second memory technology with a smaller cell size than SRAM.

20. The semiconductor device of claim 12, wherein the cache is collocated with the processor on a single chip package.

* * * * *